(12) United States Patent
Kirby

(10) Patent No.: US 7,564,477 B2
(45) Date of Patent: Jul. 21, 2009

(54) SKI SPEED DETERMINATION SYSTEM

(76) Inventor: Richard Kirby, Le Meffrey, 112, Allée des Chanterelles (FR)

( * ) Notice: Subject to any disclaimer, the term of this patent is extended or adjusted under 35 U.S.C. 154(b) by 1282 days.

(21) Appl. No.: 10/346,713

(22) Filed: Jan. 17, 2003

(65) Prior Publication Data

US 2004/0075737 A1    Apr. 22, 2004

(30) Foreign Application Priority Data

Jan. 18, 2002   (FR)   .................................. 02 00631

(51) Int. Cl.
*H04N 7/18* (2006.01)
*H04N 9/47* (2006.01)
(52) U.S. Cl. ......................................... 348/61; 348/135
(58) Field of Classification Search ................ 348/61
See application file for complete search history.

(56) References Cited

U.S. PATENT DOCUMENTS 5,828,444 A * 10/1998 Nomura ....................... 356/28

6,697,501 B2 * 2/2004 Tevs et al. .................... 382/107

FOREIGN PATENT DOCUMENTS

| DE | 195 24 842 A | 7/1988 |
| DE | 195 18 638 A | 11/1996 |
| DE | 19524842 A1 * | 1/1997 |
| DE | 197 25 904 A | 12/1998 |
| DE | 100 14 253 A | 9/2001 |
| FR | 2 609 174 A | 1/1997 |

OTHER PUBLICATIONS

French Search Report from French priority application No. 0200631, filed Jan. 18, 2002.

* cited by examiner

*Primary Examiner*—Tung Vo
*Assistant Examiner*—Anner Holder

(57) ABSTRACT

The invention concerns a system for the measurement of the speed of a ski containing a devices attached to the ski capable of taking successive images of the surface passing under the ski, some means of measuring displacement by comparing successive images, and some means of calculating the speed from the measured displacement.

44 Claims, 4 Drawing Sheets

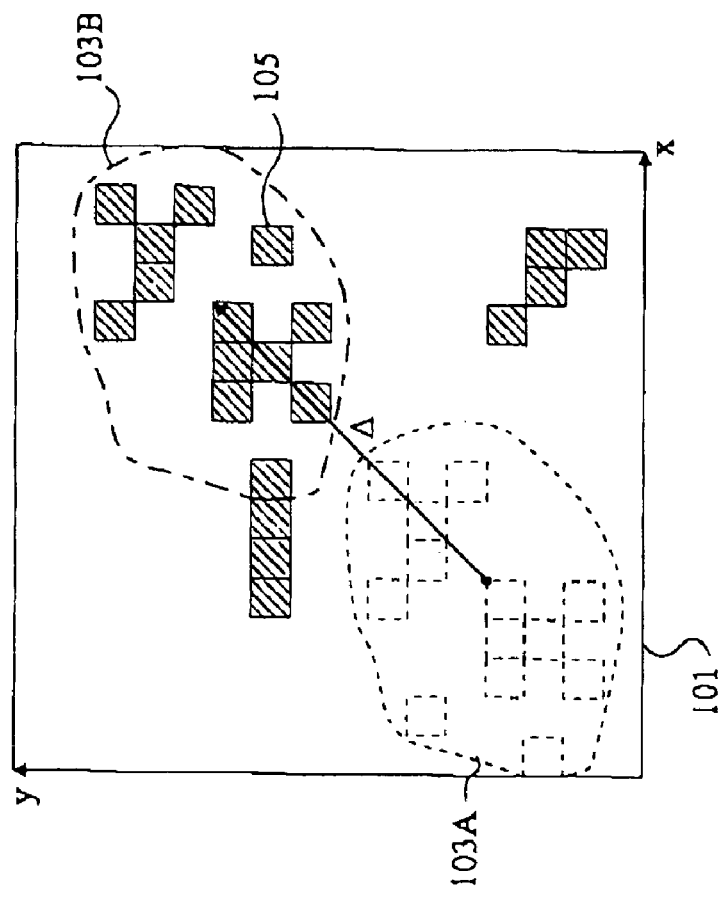
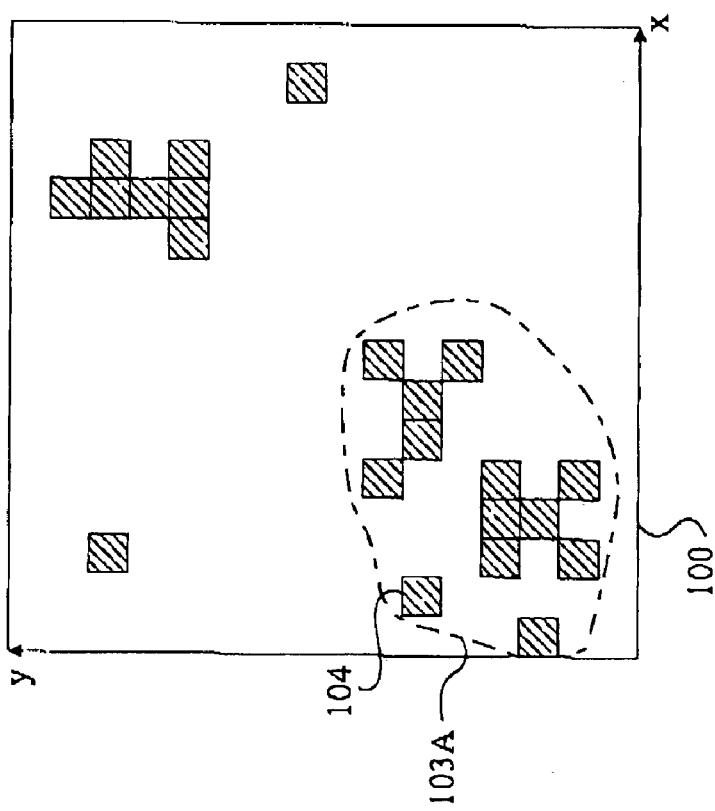
Fig 3

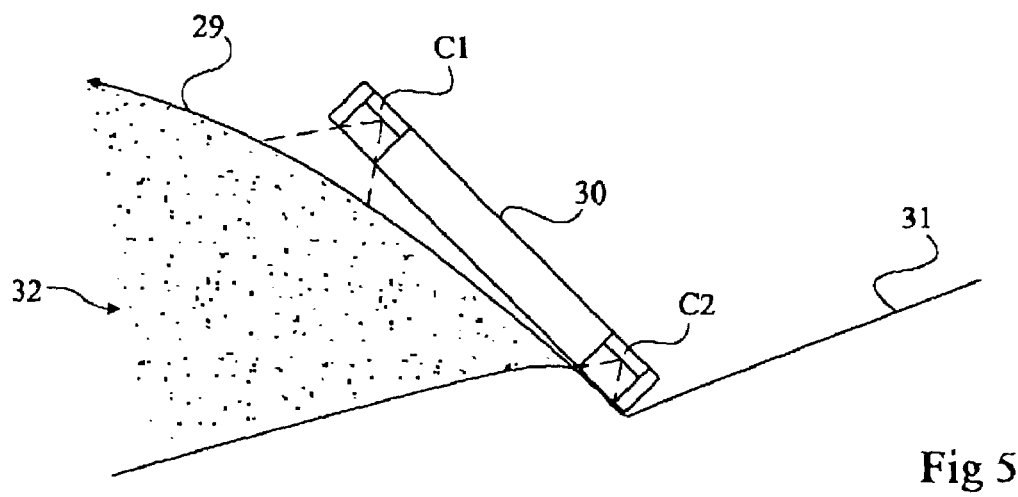
Fig 5
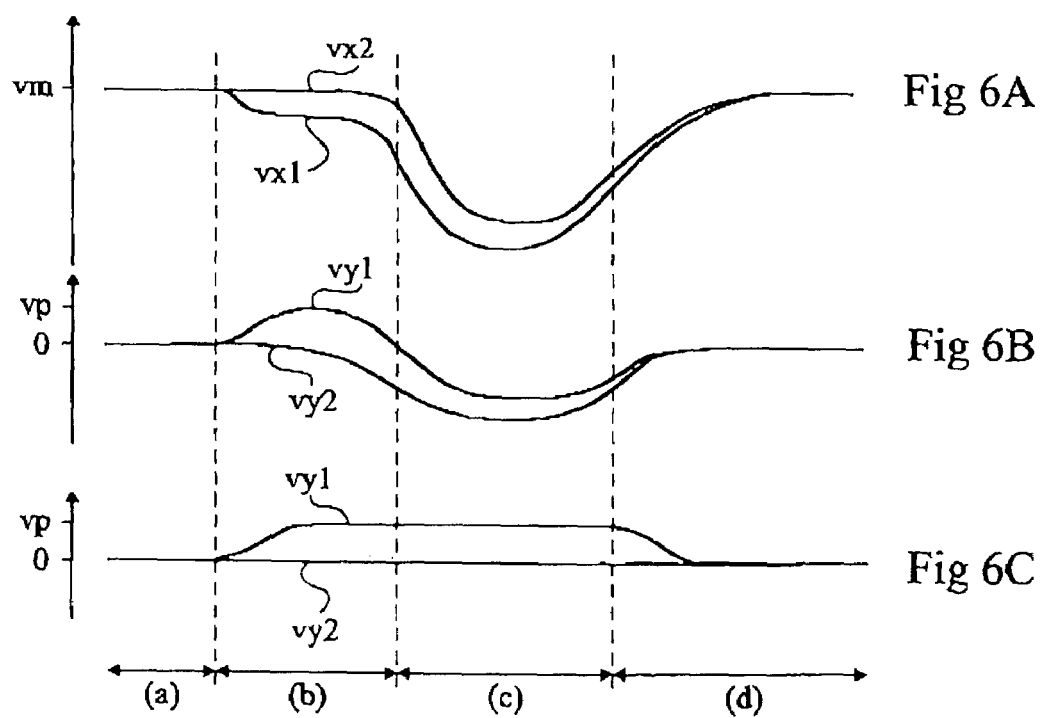
Fig 6A
Fig 6B
Fig 6C

SKI SPEED DETERMINATION SYSTEM

BACKGROUND OF THE INVENTION

1. Field of the Invention

The present invention relates to the measurement of speed of a moving objective that slides on a frozen surface, such as snow, ice or similar surfaces. It is applicable to the measurement of the speed of a ski, ice skate, luge, bobsled, snowboard or similar equipment.

2. Background of the Invention

A first category of devices for measuring speed consists of devices that require external equipment previously installed. The external equipment can be, for example, a radar, a camera or an installation of photocells. The later, well know in the area of skiing, allows the determination of the average speed of the skier between two gates where photocell traps are installed.

There also exist devices for measuring speed, which use a means of positioning by triangulation, such as GPS (Global Positioning System). The position derived is accurate to several meters and the altitude derived is not very accurate. These systems are not well adapted to the determination of the speed of a skier over distances that are relatively short. In addition, the acquisition time is relatively long and obstacles can block the signal.

The devices in this first category require external equipment that is general costly and which must be installed in advance.

A second category of devices for measuring speed consists of devices that do not require an external infrastructure—they are autonomous. Included among these devices are, RPM counters that permit the determination of the speed of a bicycle or a car. For a runner there is the pedometer. The distance between the legs of a runner is proportional to the angle formed by the legs. By summing these distances one determines the speed of the runner. Contrary to the cyclist or runner, the skier doesn't have anything that makes a repetitive motion permitting measurements in such a fashion.

Other autonomous devices exist for the measurement of speed using information provided by one or more accelerometers. The detected acceleration values permit the calculation of the change in speed between two points in time. These devices require relatively complex computation. In addition, the determination of instantaneous speed requires knowledge of the history of speed changes from the start. Any error is therefore cumulative. In addition, these devices are poorly adapted to the measurement of the speed of a ski that is exposed to shock and vibration.

The German Patent DE 195 24 842 describes a device for the measurement of the speed of a ski. The measurement device contains a source of light that lights the surface of the snow passing under an opening formed in the ski. Two sensors placed in the opening receive the reflected light from two distinct zones of the lighted surface. The surface of the snow passing under the ski, having an irregular structure, causes the intensity of the light received by each sensor to fluctuate. The two sensors are placed one behind the other along the axis of the ski in such a way that the form of the signals received by each sensor is practically identical except shifted in time. The shift between the two varies as a function of the speed of the ski, the faster the ski the smaller the time difference and the slower the ski the greater the time difference. Some means of analysis, attached to the ski, determines the speed through a method of correlation using the time difference of the two signals received by each of the sensors. Knowing the space between the two sensors, the device calculates the instantaneous longitudinal speed, which is the distance between the sensors divided by time between the signals. The patent does not indicate how skidding is treated. Skidding is very common in a ski and the determination of speed is particularly important in such situations. In addition, the device in the Germany patent does not function when the ski is inclined and no longer in flat contact with the surface of the snow and when particles of snow are being projected under ski, hiding the surface from the sensors.

It is an object of the present invention is to provide a simple autonomous measurement system for longitudinal and lateral speed of a ski.

It is another object of the present invention is to provide this autonomous system capable of measuring longitudinal speed in the axis of the ski even during a skid.

It is another object of the present invention is to provide this autonomous system capable of measuring the speed of a ski no matter how it is inclined.

It is another object of the present invention is to provide this autonomous system capable of detecting the skidding of the ski.

SUMMARY OF THE INVENTION

To attain these objectives the present invention envisions attaching to a ski a device which permits the rapid taking of successive images of the snow passing under the ski while the ski is in motion, comparing these successive images to find the change of position of identical patterns within the images, deduce the displacement of the ski from the movement of the patterns, and to calculate the longitudinal and lateral components of the speed of the ski during each time interval.

The present invention rests on the observation that every portion of a snow or ice surface is unique concerning its optical characteristics and that it is possible to take an image of these unique features. In addition, the inventor states that it is also possible to take an image of a mass of airborne snow particles and that each mass of airborne particles has unique optical characteristics. As a result, whether the ski is in contact with the surface or raised on one edge due to being inclined, it is possible to take successive images of the snow surface or of the airborne particles. In the case where the images collected by the sensors contain a portion in common, this common portion could be identified and the displacement vector of the ski calculated.

Preferably an electronic component for determining the incremental displacement of the ski from these success images of the snow surface is placed close to a device attached to the ski which takes the images.

The displacement vectors are transferred to a device to calculate the speed that is then relayed to a display or alarm. The devices for measuring displacement, for calculating the longitudinal and lateral components of the speed, and the display or alarm can be grouped on the ski or partitioned between the ski, a device attached to the skier and/or a remote station. Some appropriate means of communication assures the linking of these devices.

At the remote station, one could record the series of displacement vectors and the speed values in order to perform later, an analysis of the trajectory of interest to the skier or his coaches.

BRIEF DESCRIPTION OF THE DRAWINGS

These objectives, characteristics, and advantages as well as others of the present invention will be exposed in detail in the following description of the preferred embodiments that reference, but are not limited to, the attached drawings, of which:

FIGS. 3A and 3B represent two successive images obtained by a device in accordance with the invention

FIG. 5 is a cross sectional view of a ski incorporating two displacement measurement devices in accordance with the present invention; and FIGS. 6A to 6C are the timing diagrams of the longitudinal and lateral speeds furnished by the measurements devices in FIG. 5.

DETAILED DESCRIPTION OF THE PREFERRED EMBODIMENT

Figure 1:
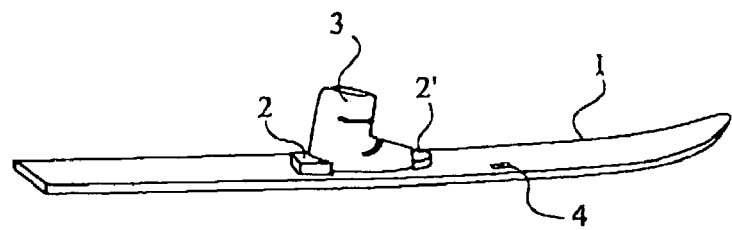
FIG. 1 represents a ski on which a device for measuring displacement is attached according to the invention.

FIG. 1 represents a ski 1 on which is placed the binding 2 and 2' to attach a boot 3. The present invention envisions installing in a cavity 4 in ski 1 a displacement measurement device of the type in the following description.

Figure 2:
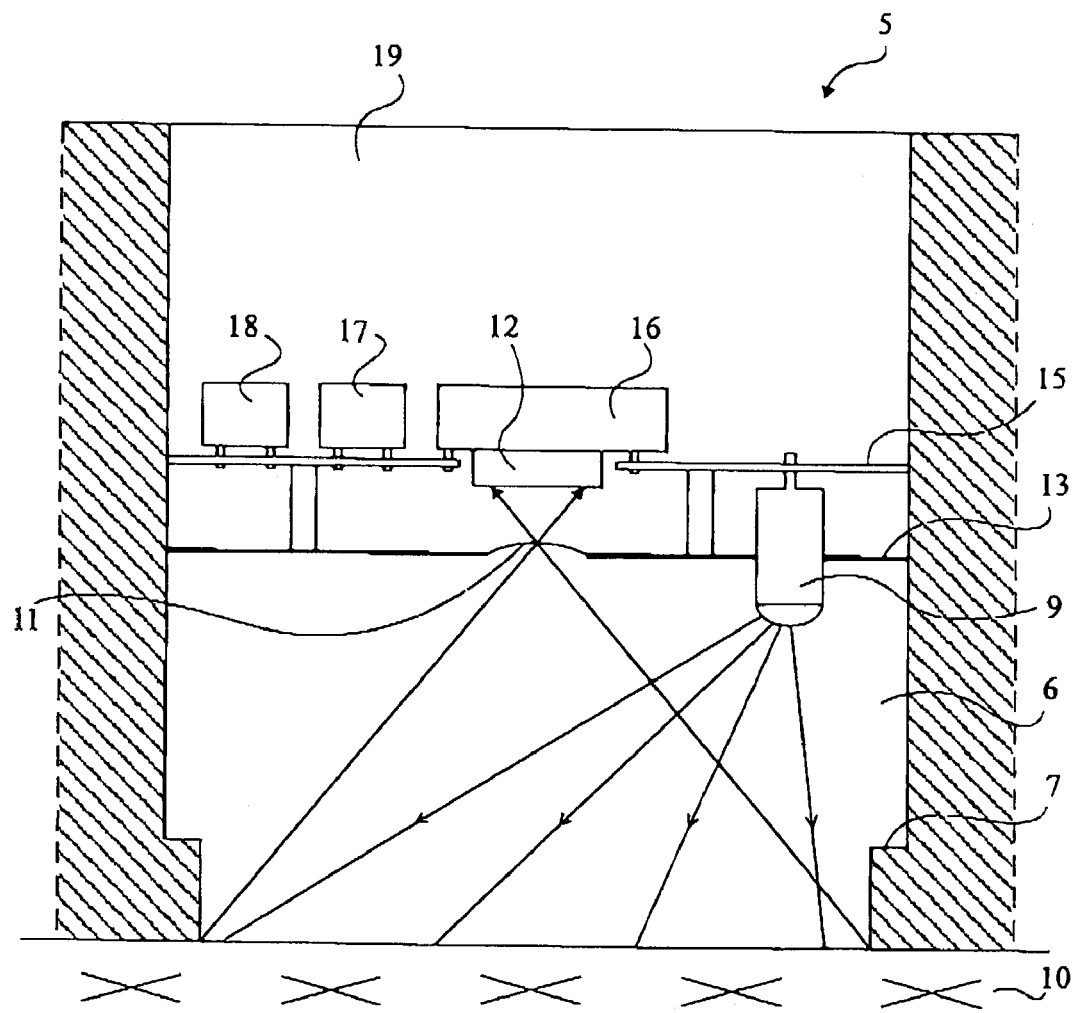
FIG. 2 is a cross sectional view of a ski incorporating the displacement-measuring device according to an embodiment of the present invention.

FIG. 2 is a cross sectional view of the ski 1 at the cavity 4 in which the speed measurement device 5 is inserted in accordance with an embodiment of the invention. The cavity 4 defines, under the ski, an observation window 10 where a portion of the snow under the ski is visible. The displacement measurement device 5 in accordance with the invention contains a means to illuminate this window 10, a means to take an image through the window, and a means to treat this image.

In an embodiment of the invention, a block 6 of a transparent material, i.e. glass, is inserted in the cavity 4. This cavity and the block could have a lip 7 permitting a precise positioning of the block such that the lower surface of the block is exactly aligned with the base of the ski. The block 6 could have, in plain view, a square form that could be of the order of 10*10 mm. The material of the transparent block 6 will be chosen such that the lower surface is sufficiently scratch resistant. It could be treated for this purpose. Because of the small dimensions of the block 6 the solidity of the ski and the glide characteristics on snow are not affected. In case of damage, the block 6 can be removed from the cavity 4 and replaced with a new block. In addition, one could choose to remove the block 6 when waxing the ski.

The means for lighting the snow observation window 10 under the ski could consist of an LED 9 that is partially inserted in an opening from the top of the block 6. Multiple different methods could be used to assure that the light is directed properly toward the observation window 10.

The upper face of the block 6 forms a lens 11, which could be a part of the block 6. The lens permits the taking of an image through the observation window 10 by the image sensor 12. Preferably, the surface of the block 6 is coated with an opaque coating 13 to avoid parasitic light affecting the image sensor.

One skilled in the art will note that there are numerous variations for the illumination system used to light the snow under the observation window and the collection of images through this window. Any type of illumination could be used. One could illuminate the observation surface 10 with non-visible light such as infrared or ultraviolet. One could envision a very selective means of lighting. One possibility, among many, consists of a directional lighting system that assures that the angle of incidence of the light rays emitted by the source are identical at each point in the observation window so that the image of the same portion of the surface appears identical no matter where it is located in the observation window. In place of a block of transparent material inserted in the cavity, one could envision a transparent plate at the bottom surface of the ski, blocking the cavity and an additional plate near the middle of the cavity for the lens, a void between the two, and some means of directing the light and collecting the image.

In the embodiment illustrated, the block 6 has a height less than the thickness of the ski. However, the block 6 could also have a height equal to or greater then the thickness of the ski as a function of the optics chosen.

In the upper part of the cavity, unoccupied by the lighting and image collection systems, are the optoelectronic circuits containing the above-mentioned sensor 12. This sensor is connected to an electronic circuit to take images of the snow situated under the observation window 10, at regular intervals, and at a frequency sufficiently elevated such that it is compatible with the maximum possible speed of the skier. The present invention also envisions a means of recording the successive images and comparing them to determine the displacement vector between two successive images, as will be show in relation to FIG. 3. Knowing the displacement vector and the time interval between two successive images one could determine the speed vector, that is the absolute speed consisting of the longitudinal and lateral components.

In the embodiment illustrated, it is envisioned to calculate only the displacement vector at the level of the ski and to transmit this displacement vector to another device to compute and display the speed. For example, one places on the PC board 15 a component 16 for calculating the displacement vectors associated with the image sensor 12, and a displacement vector transmitter 17 electrically linked to the component 16. One also envisions a power supply 18, such as a battery that could be rechargeable. The electronics in the upper part of the cavity could be embedded in resin 19. So that the power supply functions over time, if it uses a replaceable battery, an opening in the resin is envisioned to permit the replacement of the battery and if it uses a rechargeable battery, a means of connecting to an external charger is provided.

The current invention could also be realized using a single component containing both the image sensor 12 and the engine that calculates the displacement vectors 16. Today, a sensor capable of taking images of snow in contact with the ski and/or airborne snow particles which may be separated by several centimeters from the surface of the ski and permitting the measurement of speed up to 100 Km/h does not exist. However, in an embodiment of the invention, the inventor proposes the use of the Agilent component ADNS-2051 with modifications. It is necessary to modify a part of the optical system in order to obtain a greater depth of field which, permits the taking of clear images in addition it is necessary to increase the frequency at which images are taken to detect more rapid displacement. The component functions at greater than 10 MHz and for each measurement interval, provides a serial output with the two components of the displacement vector coded in a stream of bits.

FIGS. 3A and 3B represent two successive images 100 and 101 of the snow surface taken by the image sensor 12. For clarity, only black or white pixels have been represented, however the image sensor 12 can detect gray scale. In each of the images 100 and 101, the x and y axis are shown, the x axis corresponds to the direction longitudinal of the ski and the y axis corresponds to the lateral direction of the ski. As was previously described, and in accordance with a fundamental aspect of the present invention, each image of the snow contains unique visual characteristics. FIG. 3A shows such a unique visual characteristic, surrounded by the dashed line 103A, which appears in the image 100. In FIG. 3B the same unique visual characteristic appears in the image 101 identified by the reference 103B. Because the ski has moved between the two images, the unique visual characteristic 103A that was in the bottom left in the image 100 now appears as 103B in the upper right of image 101. It is also possible to have various visual artifacts, for example those referenced by 104 in pattern 103A and 105 in pattern 103B.

FIG. 3B also shows the pattern 103A in dashed lines. One can see that the movement of the pattern 103 from one image to the other is characterized by a displacement vector $\Delta$, with components $\Delta_x$ and $\Delta_y$. A component 16 for calculating the displacement vector permits the treatment of images 100 and 101 to determine the vector $\Delta$ while filtering out the various visual artifacts. Such a component will not be described in detail. A method of determining the vector $\Delta$ is incorporated in the ADNS-2051 mentioned above.

The displacement vectors calculated by the displacement measurement device 5 are sent to a device for the computation and display of the speed 20. The components of this device 20 could be located together or separated, be fixed to the ski, carried by the skier, or placed at a distant station where treatment of the data takes place.

Figure 4:
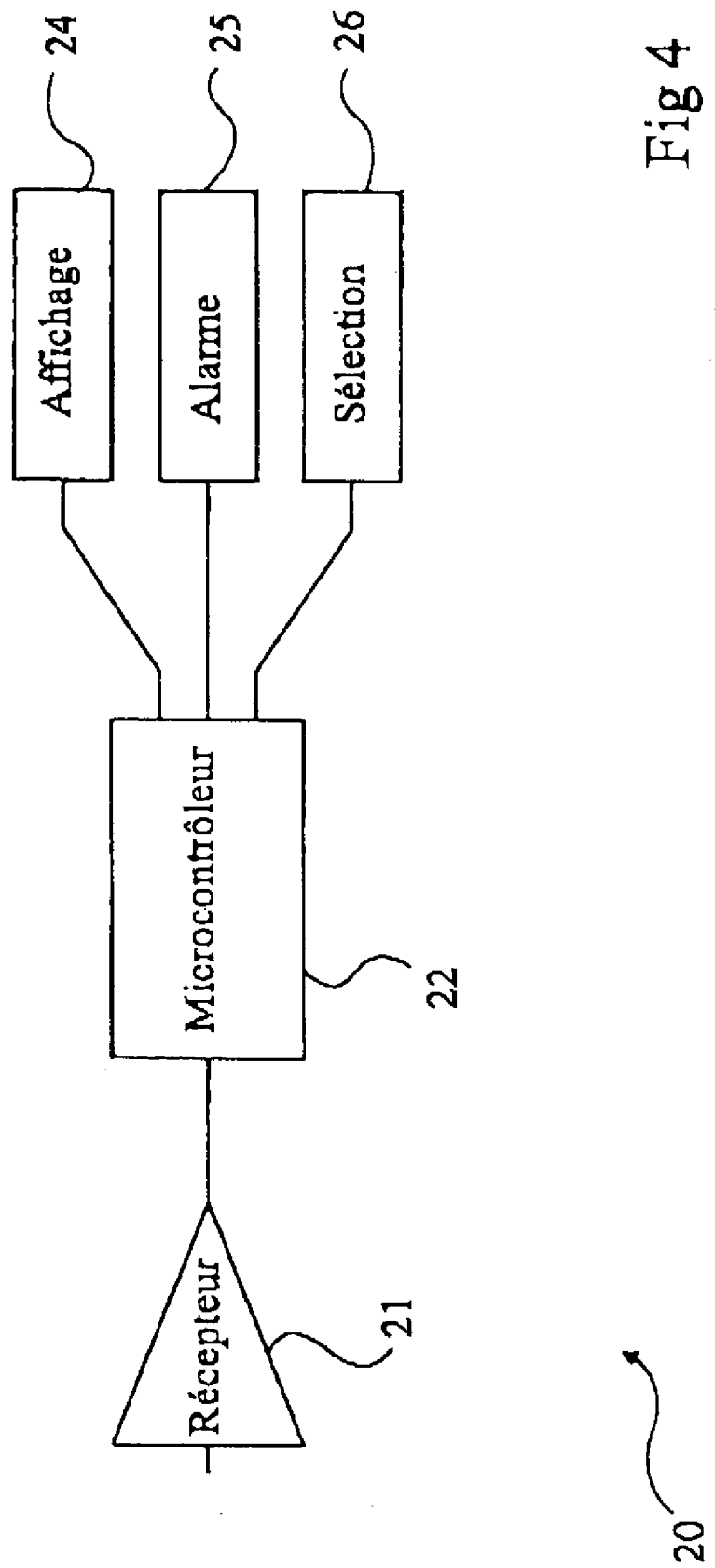
FIG. 4 is a block diagram of the speed measurement system in accordance with the invention.

As illustrated in FIG. 4, the device 20 contains a receiver 21 that receives the displacement data sent by the transmitter 17 in the displacement measurement device 5. The displacement data is transferred to a microcontroller 22 that calculates the absolute speed of the skier as well as the longitudinal and lateral speeds. The microcontroller is linked to a display 24 and/or an alarm 25. In addition one could envision a means of lighting the display as well as a means of entering data 26 that permits the activation or deactivation of various functions with the device 20.

When the ski is inclined, particles of snow are projected under the ski, as show in FIG. 5. When a single image sensor is used, normally placed in the center of the ski, a large part of the images taken by the sensors are images of airborne particles. These particles, which move relative to the snow surface, can trick the sensor. Yet, the inventor observed that the airborne particles are projected perpendicular to the axis of the ski and therefore only the lateral component of the speed, the skidding, is slightly effected. As for the measurement of longitudinal speed, it is perfectly correct.

The inventor, however, noted a slight loss of accuracy of speed when a single sensor is used and the ski is at a large angle to the surface without skidding. In this configuration, the airborne snow particles do not pass directly against the base of the ski, but follow a parabolic trajectory 29 in FIG. 5 which starts from the edge in contact with the snow and progressively becomes further from the base of the ski as it goes toward the other edge. This trajectory is formed by the upper surface of the mass of airborne particles under the ski, the upper surface being perpendicular to the cross section of FIG. 5. The further this upper surface is from the ski the greater the portion of the surface seen in the field of vision of the sensor. For the same ski displacement, the larger the portion of the surface seen by the sensor, the smaller the displacement appears to the sensor. Thus the further the surface is from the base of the ski, the lower the apparent speed.

The imprecision in the speed is relatively minor and the use of a single sensor, according to the invention, placed in the center of the ski is perfectly valid for amateur skiers not wishing to know their speed with a great precision.

In the case where the skier wishes to have a more precise measurement, one could, as represented in FIG. 5, envision placing an image sensor assembly near each edge of the ski (30). Thus two image sensor assemblies C1 and C2 each determine the longitudinal speed vx1 and vx2 respectively, and the lateral speed, vy1 and vy2 respectively. In the example of FIG. 5, the ski 30 is very inclined in relation to the surface of the snow and the image sensor assembly C2 is positioned near the edge in contact with the surface 31 of the snow. In the example of FIG. 5, the snow is soft, not frozen, and the edge of the ski carves a groove in the surface of the snow. The image sensor assembly C2 is in contact with the snow surface. The image sensor assembly C1, close to the elevated edge, is relatively far from the upper surface of the mass of airborne particles of snow 32.

FIG. 5 illustrates one example of a possible configuration of the ski relative to the snow surface. Many different configurations are possible based on the softness or hardness of the snow, the angle of the ski relative to the snow (flat, slightly inclined, or strongly inclined), and whether or not the ski is skidding. We will now consider these different possible configurations of the ski with respect to the snow.

In the configuration where the ski is flat relative to the snow surface, whether the snow is hard or soft, whether the ski skids or not, the two image sensor assemblies C1 and C2 indicate the same longitudinal and lateral speeds. (vx1=vx2 and vy1=vy2).

In the configuration represented in FIG. 5, where the ski is strongly inclined, where the snow is soft, and where the ski doe not skid, the image sensor assembly C2 is in contact with the surface of the snow and detects the exact longitudinal speed vx2 and a lateral speed vy2 of zero. The image sensor assembly C1 detects a slightly smaller longitudinal speed vx1 compared to the longitudinal speed vx2 because the image sensor assembly C1 is separated from the upper surface of the mass of airborne snow particles. The image sensor assembly C1 detects a lateral speed vx1 that corresponds to the speed of the mass of airborne snow particles.

In another possible configuration, not show, where the ski is slightly inclined, or the snow is soft and the ski does not skid, the mass of airborne snow particles are in contact with the entire base of the ski. The longitudinal speeds detected by the two image sensor assemblies C1 and C2 are identical (vx1=vx2). On the other hand the lateral speeds detected are different, the lateral speed detected by the image sensor assembly C2 is zero and that detected by the image sensor assembly C1, the speed vy1, is equal to the speed of the mass of airborne snow particles.

In the configuration where the ski is inclined without skidding and where the snow is hard, the ski does not sink into the snow and the image sensor assembly C2 is not in direct contact with the snow surface. The lateral speed vx2 detected by the image sensor assembly C2 is not zero even though the ski does not skid, this lateral speed corresponds to the movement of the mass of airborne snow particles. The lateral speed vx1 detected by the image sensor assembly C1 is slightly less or equal to that detected by the image sensor assembly C2, the speed vy2, depending on whether the distance between image sensor C1 and the airborne snow particles is respectively large or small. Even though the image sensor assembly C2 may be separated from the snow surface, the airborne snow particles will always be in contact because of the proximity of image sensor assembly C2 to the surface. The longitudinal speed vx2 detected by the image sensor assembly C2 is exact, the speed detected by the image sensor assembly C1 is less than that detected by image sensor assembly C2 to varying degrees depending on the angle of the ski.

In the configuration where the ski is inclined and skidding sideways, whether the snow is hard or soft, the ski "catches"

the airborne mass of snow particles and the upper surface of this mass of airborne snow particles is in contact with the entire width of the base of the ski. The longitudinal speeds detected by both image sensor assemblies C1 and C2 are identical and accurate (vx1=vx2). In the case where the snow is hard, the two image sensor assemblies, being off the snow surface, detect identical lateral speeds (vy1=vy2) which equals the speed relative to the mass of airborne snow particles. In the case where the snow is soft, the image sensor assembly C2 is in contact with the snow and the lateral speeds detected are different (vy1≠vy2).

In conclusion, whatever the configuration, the longitudinal speed is accurate and always given by the image sensor assembly or assemblies which detect(s) the higher speed.

In order to indicate the longitudinal speed of the ski, the computational unit, not represented, on the ski or at a distance, receives the longitudinal speeds vx1 and vx2 determined by each image sensor assembly C1 and C2. The computational unit indicates the precise longitudinal speed by indicating the greater of the two speeds vx1 and vx2.

The lateral speeds detected by the two image sensor assemblies can be used to compute instantaneous skid by means of a temporal analysis. The inventor is particularly interested in the temporal analysis of speed while a skier is making a turn. He is particularly interested in the case where the skier makes a turn on a slope that is not too steep, making an effort not to skid in order to loose the least amount of speed. The inventor envisions a program for the temporal analysis of speed, installed in a microcontroller that is capable of alerting the skier when the skier skids too much during a turn.

FIG. 6A is a temporal diagram of the longitudinal speeds vx1 and vx2 determined by the two image sensor assemblies C1 and C2 during a turn. Before the turn, phase (a) the skis are generally flat and the skier does not skid. The speeds vx1 and vx2 are identical and equal to vm. Just before turning, phase (b), the skier puts the skis on edge without skidding sideways. The speed vx1 from the image sensor assembly C1 placed near the upper edge of the ski, is slightly lower then vx2. During the turn, phase (c), the skier looses some speed and could loose more if the skids. In either case, the two speeds vx1 and vx2 fall during phase (c), the difference between vx1 and vx2 fluctuates as a function of the skidding and inclination of the ski. In the example in FIG. 6A, the ski stays inclined and the skier experiences very little skidding. At the end of the turn phase (d), the ski progressively returns to a flat position and the two speeds vx1 and vx2 equalize.

FIGS. 6B and 6C are two possible temporal diagrams of the lateral speeds vy1 and vy2 determined by the image sensor assemblies C1 and C2. Before the turn, phase (a), the skier does not skid and the lateral speeds are non-existent. At the point in time where the skier inclines the skis without skidding, phase (b), one of the image sensor assembly, C1 in this example, detects a lateral speed equal to the speed of the mass of airborne snow particles vp (vy1=vp and vy2=0). During the turn, phase (c), the speeds vary depending on the skid of the skier.

In the example shown in FIG. 6B, the skier skids. The speed vy2 from the image sensor assembly C2 in contact with the snow surface becomes negative. The speed vy1, which is positive during phase (b), becomes negative, which signifies that the ski skids faster than the speed of the mass of airborne snow particles.

In the example shown in FIG. 6C, the skier doesn't skid. The speed vy2 remains non-existent and the speed vy1 from the upper image sensor assembly remains positive and equal to the speed of the mass of airborne snow particles.

At the end of the turn, phase (d), the skier returns the skis to a flat position and stops skidding. The speeds vy1 and vy2 return to zero.

In order to detect if the skier skids during a turn, the present invention envisions incorporating a program that detects the moment that the skier inclines the skis without skidding. This corresponds to the speeds vx1 or vx2 becoming different one from the other and at least one of the speeds vy1 and vy2 becoming non-zero. Once the program has detected that the skier has inclined his skis, it then determines if the skier is turning by determining if vx1 or vx2 declines. In the case where the skier is turning, the program analyzes the speeds vy1 and vy2 in order to detect a change of sign. In the case where the program detects a change of sign, an alarm is triggered that indicates that the skier is skidding.

One could envision triggering the alarm before the lateral speed vy1 becomes negative by detecting a diminution of vy1 compared to the speed vp corresponding to the maximal speed recorded when the skis were inclined in phase b. The lateral speed can be estimated as being equal to the speed vy1 minus the speed vp. One could also envision triggering an alarm when the reduction of vy1 exceeds a certain percentage of the longitudinal speed (vy1).

Naturally, someone skilled in the art will know how to create a program capable of detecting the different phases of a turn and of signaling too much skidding whatever the sense of the turn, whether the image sensor assembly C2 is close to the edge in contact with the snow or close to the edge which is elevated. The inverse is true for the image sensor assembly C1.

An advantage to placing two image sensor assemblies one at each edge of the ski is to allow the determination of the skid rate.

In addition, it is possible that the surface of the snow is not perfectly even and could have pockets or grooves which may produce images that are totally black or white. The speed calculated from these sequences is zero even though the ski moves. However, the defects that cause such errors are small and the errors are of a short duration. Thus, one could envision a program that uses the maximum longitudinal speed chosen among the last n speed measurements calculated by each of image sensor assemblies. The quantity n could be, for example, 20.

In addition, one could envision recording the speed and displacement data for later analysis. A system for delayed analysis permits one to visualize the trajectory of the skier and to know the speed of the ski during each point in the trajectory.

The system of analysis and display could be small. They could be incorporated into the ski. They could be placed in a portable enclosure attached to the skier, like a wristwatch. If one assumes that the skier can't be distracted to look at the device, one could envision uniquely, or in conjunction with the display, the usage of audible sounds, such as alarms or spoken words to communicate the information.

Several analysis systems could be associated to one or multiple measurement system. For example, a portable device attached to the skier and another at a distant station. The immediate knowledge of a too great lose of speed or of too much skidding permits the skier to perform a real-time self analysis. Thus, he can easily perceive which movements cause the lose of speed. In parallel, the coach can have at his disposal a device that continuously receives the displacement data. Thus the coach can analyze the descent of the skier as a whole and determine in which areas the skier looses speed. A precise analysis of the radius of a turn can permit the identification of the phase of the turn responsible for the braking effect and the corresponding movement of the skier. This type of detailed analysis, not possible today, is accurate.

In addition, one can envision the device attached to the ski or skier recording the displacement data as the skier skis, for example, a slalom. Once the slalom is finished the recorded data can be downloaded to a powerful analysis system like a computer. One could then analyze the different passages in the slalom. By comparing different trajectories one learns which trajectory is the most rapid.

One could also envision attaching one or more speed measurement systems described in the present invention to each ski in order to obtain a speed measurement for each ski. Effectively, the skis are not constantly parallel and they don't always move exactly at the same speed. Thus, one could learn the difference in speed during the different phases of a turn.

Contrary to the device in the German patent mentioned above that measures at a given time, through two sensors, the average reflected light in two distinct zones of the snow surface in an observation window in the ski, the device in the present invention takes a single image of all the snow surface visible in the observation window. Thus, instead of analyzing two series of values of average luminosity received sequentially by two sensors and corresponding to the reflected light in the two approximately equivalent zones of the surface of the snow, the device in the present invention analyzes uniquely two consecutive detailed images of all the snow surface in the observation window. The precision derived from an image of a pattern, taken by the device of the present invention, permits a much more precise computation of the speed.

In addition, in the case where the ski only skids without any forward motion or where the forward motion is moderate, the device in the German patent, dependent on the measure of reflected light collected by two sensors placed in the axis of the ski, will not function. Just as the device in the German patent is likely not to function in the case where the two sensors do not see exactly aligned zones when the ski skids. In these cases the sequential luminosity values can be totally different.

Naturally, the present invention could be realized in many different variations and modifications, which are evident to someone skilled in the art. In particular the means of communication between the different elements of the system could be any know type of communication. In addition, the displacement measurement device could be placed elsewhere than in the ski, i.e. attached to the ski binding.

Moreover, in the case where several sensors are placed in the same ski, they may not necessarily placed side by side but may be positioned one further forward or behind the other along the ski.

In the case of an installation that consists of a device on the ski, a mobile device, and a device at a distant station, one could share in multiple ways, the elements that constitute the invention. The calculation of speed could be done at any of the three locations. It could also be done independently in several of the three locations. Some means of transmission and reception could be envisioned in two or three locations, etc.

The device described here concerns skis, but could also be applied to a luge, ice skates, snowboard, bobsled, or in general, to any object which slides against a surface of snow or ice.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. An apparatus to measure displacement of an object sliding on a surface of snow or ice comprising:
   a first imaging device to take a first series of digital images of a first portion of said surface;
   a second imaging device to take a second series of digital images of a second portion of said surface;
   a pattern detection device to detect one or more first common spatial patterns in said first series of digital images and to detect one or more second common spatial patterns in said second series of digital images;
   a displacement device to determine first displacements of said first common spatial patterns between said first series of digital images and to determine second displacements of said second common spatial patterns between said second series of digital images; and
   a first analysis device to generate a measured displacement based on a determination of which of said first and second displacements more accurately represents true displacement.

2. The system apparatus of claim 1, wherein said first and second series of digital images are two dimensional.

3. The apparatus of claim 1, wherein said first and second series of digital images comprise grayscale information.

4. The system of claim 1, wherein said pattern detection device detects multiple common spatial patterns in said successive digital images.

5. The apparatus of claim 1, wherein said first analysis device to provide a two dimensional displacement vector based on said measured displacement, wherein said two dimensions are longitudinal displacement and lateral displacement.

6. The apparatus of claim 5, further comprising a speed device to calculate a measured speed based on said measured displacement.

7. The apparatus of claim 1, wherein said object is a single ski, a pair of skis, or a snowboard and said first and second imaging devices are attached to said object.

8. The apparatus of claim 1, wherein said first and second imaging devices each include a light sensitive sensor and a source of illumination to direct light rays onto said first and second portions of said surface in a manner such that the angles of incidence of said light rays from said source of illumination are substantially identical at all points on said first and second portions of said surface imaged by said first and second imaging devices.

9. The apparatus of claim 6, further comprising an alarm to alert of changes in said measured speed and/or said lateral displacement.

10. The apparatus of claim 1, further comprising a display.

11. The apparatus of claim 9, wherein said alarm to indicate when said lateral displacement exceeds a threshold value.

12. The apparatus of claim 6, further comprising a second analysis device to record and analyze the measured displacement and/or the measured speed.

13. An apparatus to measure displacement of an object sliding on a surface of snow or ice comprising:
   a first imaging device to take a first series of two dimensional digital images of a first portion of said surface;
   a second imaging device to take a second series of two dimensional digital images of a second portion of said surface;
   a pattern detection device to detect one or more first common two dimensional spatial patterns in said first series of two dimensional digital images and to detect one or more second common two dimensional spatial patterns in said second series of two dimensional digital images;

a displacement device to determine first displacements of said first common two dimensional spatial patterns between said first series of two dimensional digital images and to determine second displacements of said second common two dimensional spatial patterns between said second series of two dimensional digital images; and a first analysis device to generate a measured displacement based on a determination of which of said first and second displacements more accurately represents true displacement.

14. The apparatus of claim 13, wherein said first and second series of two dimensional digital images comprise grayscale information.

15. The apparatus of claim 13, wherein said first analysis device to provide a two dimensional displacement vector based on said measured displacement, wherein said two dimensions are longitudinal displacement and lateral displacement.

16. The apparatus of claim 15, further comprising a speed device to calculate a measured speed based on said measured displacement.

17. The apparatus of claim 13, wherein said object is a single ski, a pair of skis, or a snowboard and said first and second imaging devices are attached to said object.

18. The apparatus of claim 13, wherein said first and second imaging devices each include a light sensitive sensor and a source of illumination to direct light rays onto said first and second portions of said surface in a manner such that the angles of incidence of said light rays from said source of illumination are substantially identical at all points on said first and second portions of said surface imaged by said first and second imaging devices.

19. The apparatus of claim 16, further comprising an alarm to alert of changes in said measured speed and/or said lateral displacement.

20. The apparatus of claim 13, further comprising a display.

21. The apparatus of claim 19, wherein said alarm to indicate when said lateral displacement exceeds a threshold value.

22. The apparatus claim 16, further comprising a second analysis device to record and analyze the measured displacement and/or the measured speed.

23. A method to measure displacement of an object sliding on a surface of snow or ice comprising the steps of:

taking a first series of digital images of a first portion of said surface using a first imaging device;

taking a second series of digital images of a second portion of said surface using a second imaging device;

detecting one or more first common spatial patterns in said first series of digital images;

detecting one or more second common spatial patterns in said second series of digital images;

determining first displacements of said first common spatial patterns between said first series of digital images;

determining second displacements of said second common spatial patterns between said second series of digital images;

determining which of said first and second displacements more accurately represents true displacement; and generating a measured displacement based on said determination of which of said first and second displacements more accurately represents true displacement.

24. The method of claim 23, wherein said first and second series of digital images are two dimensional.

25. The method of claim 23, wherein said first and second series of digital images comprise grayscale information.

26. The method of claim 23, further comprising the step of providing a two dimensional displacement vector based on said measured displacement, wherein said two dimensions are longitudinal displacement and lateral displacement.

27. The method of claim 26, further comprising the step of calculating a measured speed based on said measured displacement.

28. The method of claim 23, wherein said object is a single ski, a pair of skis, or a snowboard and said first and second imaging devices are attached to said object.

29. The method of claim 23, further comprising the step of directing light rays onto said first and second portions of said surface in a manner such that the angles of incidence of said light rays from said source of illumination are substantially identical at all points on said first and second portions of said surface imaged by said first and second imaging devices.

30. The method of claim 27, further comprising the step of generating an alarm to alert of changes in said measured speed and/or said lateral displacement.

31. The method of claim 23, further comprising the step of displaying information.

32. The method of claim 30, wherein said alarm to indicate when said lateral displacement exceeds a threshold value.

33. The method of claim 27, further comprising the step of recording and analyzing the measured displacement and/or the measured speed.

34. An apparatus to measure displacement of an object sliding on a surface of snow or ice comprising:

a first imaging device to take a first series of digital images of a first portion of said surface, wherein said first imaging device includes a first source of illumination to direct light rays onto said first portion of said surface in a manner such that the angles of incidence of said light rays from said first source of illumination are substantially identical at all points on said first portion of said surface imaged by said first imaging device;

a pattern detection device to detect one or more first common spatial patterns in said first series of digital images; and a displacement device to determine displacements of said first common spatial patterns between said first series of digital images.

35. The apparatus of claim 34, further comprising a second imaging device to take a second series of digital images of a second portion of said surface, wherein said second imaging device includes a second source of illumination to direct light rays onto said second portion of said surface in a manner such that the angles of incidence of said light rays from said second source of illumination are substantially identical at all points on said second portion of said surface imaged by said second imaging device.

36. The apparatus of claim 35, wherein said first and second series of digital images are two dimensional.

37. The apparatus of claim 36, wherein said displacement device also to determine displacements of said second common spatial patterns between said series of digital images, and said apparatus further comprising a first analysis device to generate a measured displacement based on a determination of which of said first and second displacements more accurately represents true displacement, wherein said measured displacement includes longitudinal displacement and lateral displacement.

38. The apparatus of claim 37, further comprising a speed device to calculate a measured speed based on said measured displacement.

39. The apparatus of claim 38, further comprising an alarm to alert of changes in said measured speed and/or said lateral displacement.

40. The apparatus of claim 39, wherein said alarm to indicate when said lateral displacement exceeds a threshold value.

41. The apparatus of claim 40, wherein said object is a single ski, a pair of skis, or a snowboard.

42. The apparatus of claim 41, wherein said first and second imaging devices are attached to said object.

43. The apparatus of claim 40, further comprising a display.

44. The apparatus of claim 43, further comprising a second analysis device to record and analyze the measured displacement and/or the measured speed.

* * * * *